(12) United States Patent
Kakie (10) Patent No.: US 8,456,378 B2
(45) Date of Patent: Jun. 4, 2013

(54) ELECTRONIC DEVICE AND DISPLAY METHOD

(75) Inventor: Michito Kakie, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 588 days.

(21) Appl. No.: 12/436,212

(22) Filed: May 6, 2009

(65) Prior Publication Data

US 2009/0322650 A1     Dec. 31, 2009

(30) Foreign Application Priority Data

Jun. 30, 2008   (JP) .................................. 2008-171416

(51) Int. Cl.
*G09G 5/00*     (2006.01)

(52) U.S. Cl.
USPC ................ 345/1.3; 345/1.1; 345/2.1; 345/2.2

(58) Field of Classification Search
USPC ...................... 345/1.1, 1.3, 2.1, 2.2
See application file for complete search history.

(56) References Cited

U.S. PATENT DOCUMENTS

| | | | | |
|---|---|---|---|---|
| 5,564,002 | A * | 10/1996 | Brown | 715/778 |
| 5,841,435 | A * | 11/1998 | Dauerer et al. | 715/775 |
| 7,123,945 | B2 | 10/2006 | Kokubo | 455/566 |
| 7,583,988 | B2 * | 9/2009 | Jeon | 455/575.3 |
| 2002/0140627 | A1 * | 10/2002 | Ohki et al. | 345/1.1 |
| 2003/0119562 | A1 * | 6/2003 | Kokubo | 455/566 |
| 2004/0012538 | A1 * | 1/2004 | Bhogal | 345/1.1 |
| 2004/0257335 | A1 * | 12/2004 | Numano | 345/156 |
| 2006/0250320 | A1 * | 11/2006 | Fuller et al. | 345/1.1 |
| 2006/0293088 | A1 | 12/2006 | Kokubo | 455/566 |
| 2009/0288036 | A1 | 11/2009 | Osawa et al. | |

FOREIGN PATENT DOCUMENTS

| | | |
|---|---|---|
| JP | 05-224864 | 9/1993 |
| JP | 2001-306291 | 11/2001 |
| JP | 2003-162355 | 6/2003 |
| JP | 2004-234544 | 8/2004 |
| WO | 2007/072640 | 6/2007 |

OTHER PUBLICATIONS

Japanese Office Action mailed Apr. 17, 2012 issued in corresponding Japanese Patent Application No. 2008-171416.
Japanese Office Action mailed Mar. 26, 2013 issued in corresponding Japanese Patent Application No. 2008-171416.

* cited by examiner

*Primary Examiner* — Christopher E Leiby
(74) *Attorney, Agent, or Firm* — Staas & Halsey LLP (57) ABSTRACT

To provide a technology of moving and displaying an object concealed on a first display unit to and on a second display unit. An electronic device including a first display unit and a second display unit displays an object as a graphical user interface on the first display unit, detects that the object gets concealed, determines whether or not the concealed object is coincident with a predetermined condition, and displays the object coincident with the predetermined condition on the second display unit. When a detection unit detects that the object does not get concealed, the display of the object is deleted from on the second display unit.

6 Claims, 12 Drawing Sheets

| ID | NAME | POSITION INFORMATION | ADDITIONAL CONDITION |
|---|---|---|---|
| 1035 | A | 20, 20 | EXECUTE ***.exe |
| 1036 | B | 20, 120 | CONNECT EXTERNAL DISPLAY |
| 1037 | D | 100, 20 | CONNECT EXTERNAL DISPLAY |
| 1038 | E | 100, 120 | NO CONDITION ADDED |
| .. | .. | .. | .. |

ELECTRONIC DEVICE AND DISPLAY METHOD

CROSS-REFERENCE OF RELATED APPLICATION

This application is based upon and claims the benefit of priority of the prior Japanese Patent Application No. 2008-171416, filed on Jun. 30, 2008, the entire contents of which are incorporated herein by reference.

FIELD

Disclosed is a technology of performing display on a plurality of display devices.

BACKGROUND

With advancement of IT technologies, a variety of small-sized hand-and-palm-held portable information devices have come out in the world. Those portable information devices are small size and light weight and therefore extremely convenient to carry, and at the present not only mobile phones but also PDAs, smart phones, portable game machines and UMPCs (Ultra Mobile PCs) are consecutively put on the market.

For example, the following are the Patent documents as technologies disclosed at the present.
[Patent document 1] Japanese Patent Laid-Open Publication No. 2001-306291
[Patent document 2] Japanese Patent Laid-Open Publication No. 2003-162355

SUMMARY

The portable information device has, however, demerits because of being small-sized. One of these demerits is a problem about a screen size. The housing is small-sized, and hence the screen size reduces.

Then, the portable information device has the small screen size and therefore has more of opportunities to display a window largely than by a desktop device.

Consequently, there are many cases in which an object such as an icon is concealed on the device placed on the desktop, and the widow needs moving and minimizing for selecting the concealed icon, with the result that a user feels a stress.

In order to solve the problems given above, an electronic device disclosed in the present application comprises: a first display unit displaying an object as a graphical user interface; a second display unit; a detection unit detecting that the object gets concealed; a determining unit determining whether or not the concealed object is coincident with a predetermined condition; and a display control unit displaying the object coincident with the predetermined condition on the second display unit.

In order to solve the problems given above, there is provided a display method disclosed herein by which an electronic device comprising a first display unit and a second display unit executes: a step of displaying an object as a graphical user interface on the first display unit; a step of detecting that the object gets concealed; a step of determining whether or not the concealed object is coincident with a predetermined condition; and a step of displaying the object coincident with the predetermined condition on the second display unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

A best mode for carrying out the present invention will hereinafter be described with reference to the drawings. Configurations in the following embodiments are exemplifications, and the present invention is not limited to the configurations in the embodiments.

Figure 1:
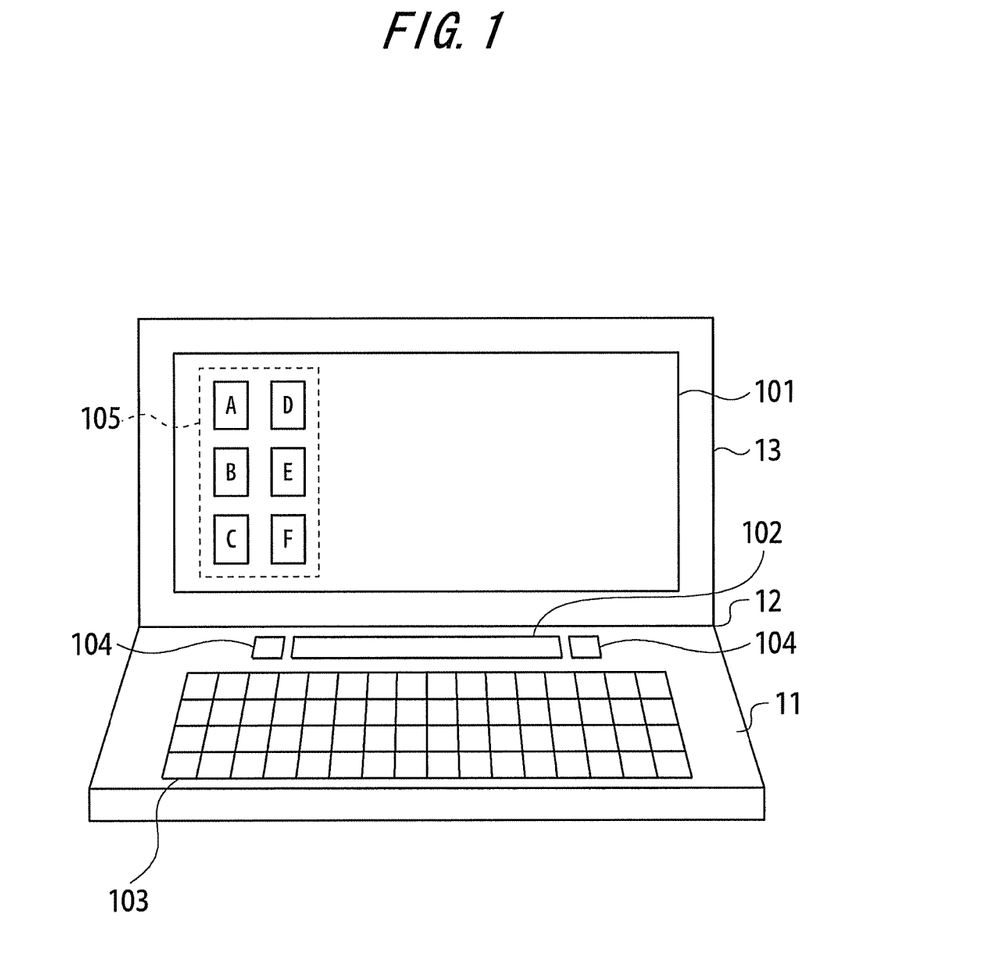
FIG. 1 is a view of an external configuration of an electronic device according to a first embodiment.
Figure 2:
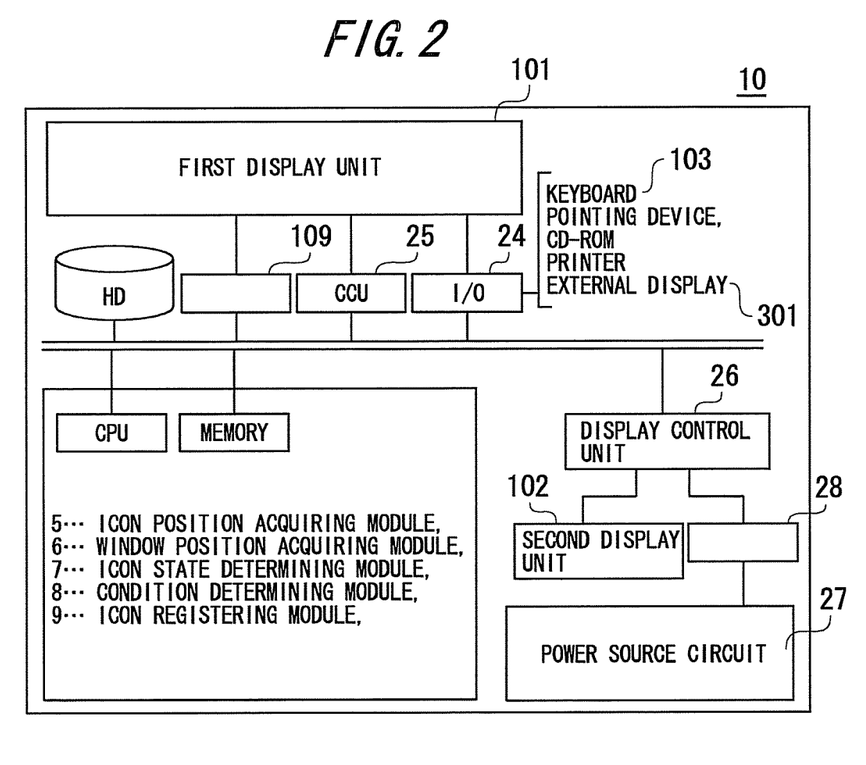
FIG. 2 is a block diagram showing a hardware configuration of the electronic device.

FIG. 1 is an external view of an electronic device according to a first embodiment, and FIG. 2 is a block diagram showing a hardware configuration of the electronic device.

The electronic device in the first embodiment is a computer, which is a so-called portable information device, provided with a display unit and a processing unit within a portable small-sized housing. As illustrated in FIG. 1, a portable information device 10 is constructed a lower housing 11 and an upper housing 13 provided in an openable/closable manner via a hinge portion 12 with respect to the lower housing 11.

Further, the lower housing 11 is provided with, as shown in FIG. 2, a keyboard 103, a second display unit (auxiliary display unit) 102 and a variety of buttons 104.

The upper housing 13 is provided with a first display unit (main display unit) 101. The first display unit 101 is provided in such a position as to be visible in a state where the upper housing 13 opens but invisible in a state where the upper housing 13 closes.

Note that the second display unit 102 is provided in such a position as to be invisible in the state where the upper housing 13 closes in the vicinity of the hinge portion 12 in the first embodiment, however, the position of the second display unit 102 is not limited to this position. For example, the second display unit 102 can be provided in an arbitrary position of the lower housing 11 and in an arbitrary position of the upper housing 13 such as an upper surface, opposite to the first display unit 101, of the upper housing 13.

As shown in FIG. 2, the portable information device 10 includes a CPU (Central Processing Unit) 21, a main memory 22, a storage unit (hard disk) 23 stored with data and software for an arithmetic process, an input/output (I/O) port 24, a communication control unit (CCU: Communication Control Unit) 25, the first display unit 101, the second display unit 102, display control units 26, 109, a power source circuit 27, a power source control unit (power MPU) 28, etc.

Input devices such as a keyboard, a mouse and a CD-ROM drive and output devices such as a printer and an external display 301 are properly connected to the I/O port 24.

The CCU 25 controls communications with other computers via a network.

The display control unit 109, which is a so-called GPU (Graphics Processing Unit), generates video signals based on a display instruction and data given from the CPU 21 for displaying a processing result etc of the CPU 21 on the first display unit 101, and outputs and displays the video signals to and on the first display unit 101. The first embodiment may take a configuration using a graphic function integrated with a graphic chip and a chipset that are packaged on a motherboard. Further, the first embodiment may also take such a configuration that the CPU 21 functions as the display control unit.

Note that the portable information device 10 in the first embodiment adopts a graphical user interface, in which a plurality of windows and objects such as icons are displayed on the first display unit 101, and, when the user operates the object, a process corresponding to the operation is executed.

The power source circuit 27 supplies the respective units of the portable information device 10 with electric power given from a battery or an external power source.

The power source MPU 28 inputs, to the display control unit 26 and the CPU 21, items of state information showing a state of the power source circuit 27 such as whether the external power source is connected or not and a battery residual quantity.

The first embodiment has exemplified the example of the information showing the state of the power source circuit 27 as the state information of the portable information device 10, however, the state information is not limited to this type of information. For example, it is sufficient that the state information is information showing states of hardware and the software of the portable information device 10 such as the (hardware) state of peripheral equipment like a TV tuner, and the software state like a mail receiving state.

The second display unit 102 displays the state etc of the portable information device 10 under the control of the display control unit 26. The second display unit 102 according to the first embodiment provides the smaller and simpler display than by the first display unit 101. Note that the second display unit 102 may adopt segment display without being limited to the matrix display.

Moreover, the second display unit 102 includes a touch sensor, whereby the user can, when touching a display surface (detection surface), recognize the contact position. To be specific, the objects such as the icons are displayed on the second display unit 102, and, when the user touches the object with a finger or a stylus, the object touched (i.e., selected) by the user can be specified.

The display control unit 26 is a circuit which controls the display of the second display unit 102 and gets the state of the portable information device 10 displayed on the second display unit 102 on the basis of the state information. For example, the battery residual quantity, the connecting state of the external power source, etc are displayed based on the state information given from the power source MPU 28.

Further, the display control unit 26 displays, as will be mentioned later on, a concealed object on the first display unit 101.

The storage unit 23 is preinstalled with an operating system (OS) and application software (a display program etc).

The CPU 21 properly reads the OS and the application program from the storage unit 23 via the memory 22 and executes the OS and the application program, and further executes the arithmetic process of the information inputted from the I/O port 24 and the CCU 25 and the information read from the storage unit 23, thereby functioning also as an icon position acquiring module 5, a window position acquiring module 6, an icon state determining module 7, a condition determining module 8 and an icon registering module 9.

The CPU 21 serving as the icon registering module 9 registers the icon set as a moving target icon through user's designation and a condition thereof in a condition table.

The CPU 21 serving as the icon position acquiring module 5 acquires a position of the icon displayed on the first display unit 101 by use of an API (Application Program Interface) of the OS.

The CPU 21 serving as the icon state determining module 7 determines whether or not there is any icon concealed by displaying the object on the first display unit 101. The icon state determining module 7 and the icon position acquiring module 5 correspond to a detecting unit in the first embodiment.

The determination about whether the icon is concealed or not may be made from determining that the icon is concealed when the icon is even slightly overlapped with the object and concealed at a predetermined rate (e.g., 70%) or completely concealed. The determination about a case where the icon does not get concealed is made in the same way.

Note that a criterion for determining that the icon is concealed may be different from a criterion for determining that the icon is not concealed. For example, the icon may be determined to be concealed if concealed at 70% or more and may also be determined not to be concealed if concealed at 10% or less.

The condition determining module 8 determines from referring to a condition table whether or not the icon determined to be concealed by the icon state determining module 7 is coincident with the condition for the movement to the second display unit, then, if coincident, notifies the display control unit 26 of this purport, and displays the icon on the second display unit 102. The moving condition is exemplified such as whether the icon is registered in the condition table or not. A scheme of the first embodiment is that an additional condition can be set for further narrowing down the moving icons.

With this scheme, the icon, when concealed by the first display unit 101, appears on the second display unit 102, and hence it is feasible to actualize a user interface as if the icon moves over.

Incidentally, the icon is displayed on the second display unit 102, during which the icon may be disappeared from the first display unit 101, however, the icon on the first display unit 101 may exist so as to be concealed in a way that undergoes nothing.

Further, the condition determining module 8, if the icon state determining module 7 notifies the condition determining module 8 that the icon displayed on the second display unit 102 does not get concealed, i.e., the state changes to the state displayed on the first display unit 101, notifies the display control unit 26 of erasing the display of the icon.

Further, the CPU 21, when the icon is selected on the occasion of displaying the icon on the second display unit 102, executes a process assigned to the icon.

A display method by which the portable information device 10 having the configuration described above moves and displays the icon concealed on the first display unit 101 to and on the second display unit 102 according to a display program, will hereinafter be described with reference to FIGS. 3-8.

Figure 3:
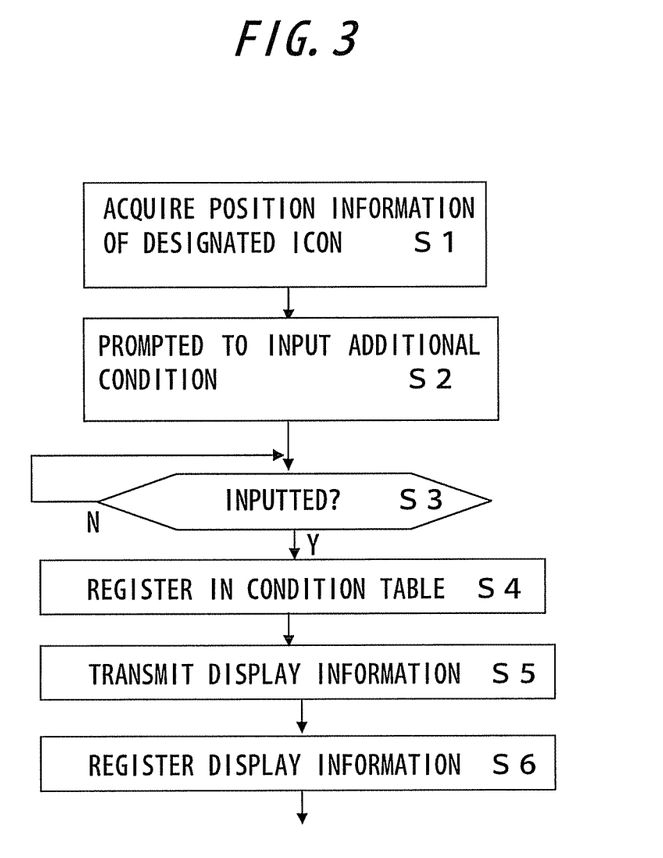
FIG. 3 is an explanatory diagram of a process of registering a moving target icon.

FIG. 3 is an explanatory diagram of a process of registering the moving target icon.

To start with, the user gives an instruction for registration by designating the moving target icon on the first display unit 101 in a way that operates the keyboard, the mouse, etc. Corresponding to the operation, the portable information device 10 starts the registration process and acquires position information of the icon designated by the icon position acquiring module 5 (step 1, which will hereinafter be also abbreviated such as S1).

Moreover, the icon registering module 9 prompts the user to input an additional condition by displaying an input window on the first display unit 101 (S2).

If the additional condition is inputted (S3), the icon registering module 9 registers the icon position and the additional condition in the condition table in the way of their being associated with each other (S4).

Moreover, the icon registering module 9 transmits an image and a name, a property, etc of the moving target icon as display information to the display control unit 26 (S5). Then, the display control unit 26 stores the received display information in the memory (S6).

The display information may be the same as the information displayed on the first display unit 101 and may also be converted corresponding to the second display unit 102. For example, the conversion is carried out such as reducing the number of pixels (pixel count) and the number of colors (color count) of the icon image and changing an aspect ratio thereof, corresponding to a display capability of the second display unit 102. Moreover, the display information may also be structured as only a file name while omitting the image. In this case, it may be sufficient that character codes can be processed, thereby enabling the display control unit 26 and the second display unit 102 to be simplified.

A further available scheme is that the icons displayed on the second display unit 102 are predetermined such as [F1], [F2], [F3] . . . , and the user selects this type of icon when registering the moving target icon. For example, in the case of selecting [F1] as the moving target icon when registering any one of the icons on the first display unit 101, if the icon is concealed by the first display unit 101, [F1] is displayed on the second display unit 102. Thus, the icons to be displayed on the second display unit 102 are determined beforehand, the icon can be displayed by a segment method.

Namely, a requirement for the movement of the icon in the first embodiment may be such that the user can recognize the movement of the icon by seeing that the icon corresponding to the concealed icon is displayed on the second display unit 102, then the icon on the first display unit 101 may be apparently different from the icon on the second display unit 102, and the movement initiator icon may exist while being concealed.

Further, the display information may have an addition of information such as an ID and position information for associating the icon on the first display unit 101 with the display information displayed on the second display unit 102.

For example, when the condition determining module 8 notifies the display control unit 26 of the ID of the icon that is moved and displayed, the display control unit 26 displays the display information to which the ID is added.

Figure 4:
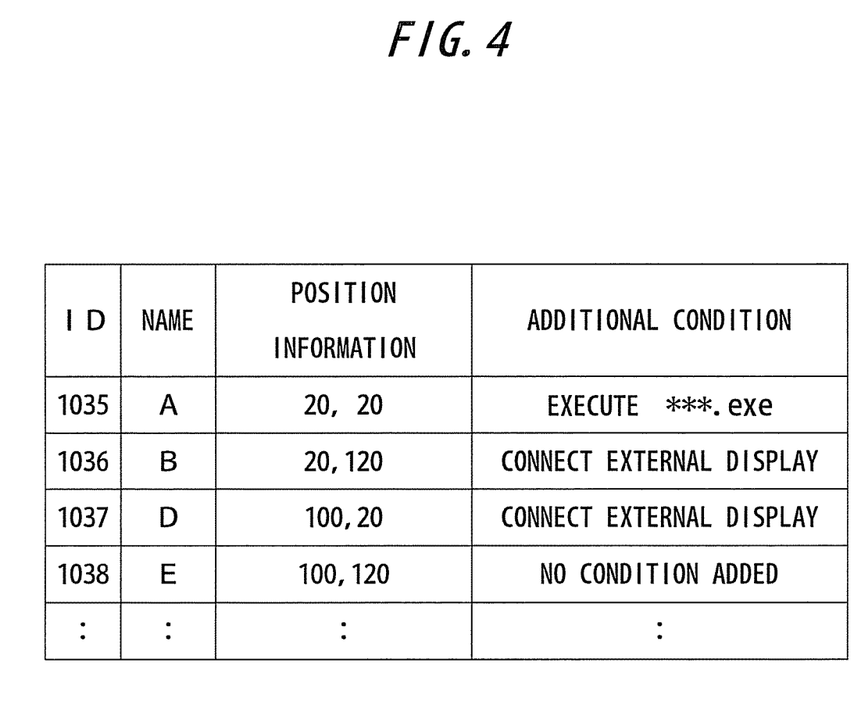
FIG. 4 is a diagram showing one example of a condition table.

FIG. 4 illustrates one example of the condition table in the first embodiment. In the condition table, the ID is at least a unique piece of information in the condition table, and the position of the icon is defined by coordinates on the first display unit 101. Further, the additional condition is a condition that can be arbitrarily set by the user in order to narrow down the moving condition, such as executing the specified application and connecting the external display.

For example, the additional condition is, it is assumed, that application software for presentation is executed with respect to an icon of a data file opened by the application software for the presentation. This scheme enables the setting to be done so that the icon moves when the application software is executed but does not move when the application software is not executed.

Moreover, the additional condition is, it is assumed, that the external display is connected with respect to the icon of the data file opened by the application software for the presentation. This scheme enables the setting to be done so that the icon moves when the external display is connected but does not move even if concealed when the external display is not connected.

Figure 5:
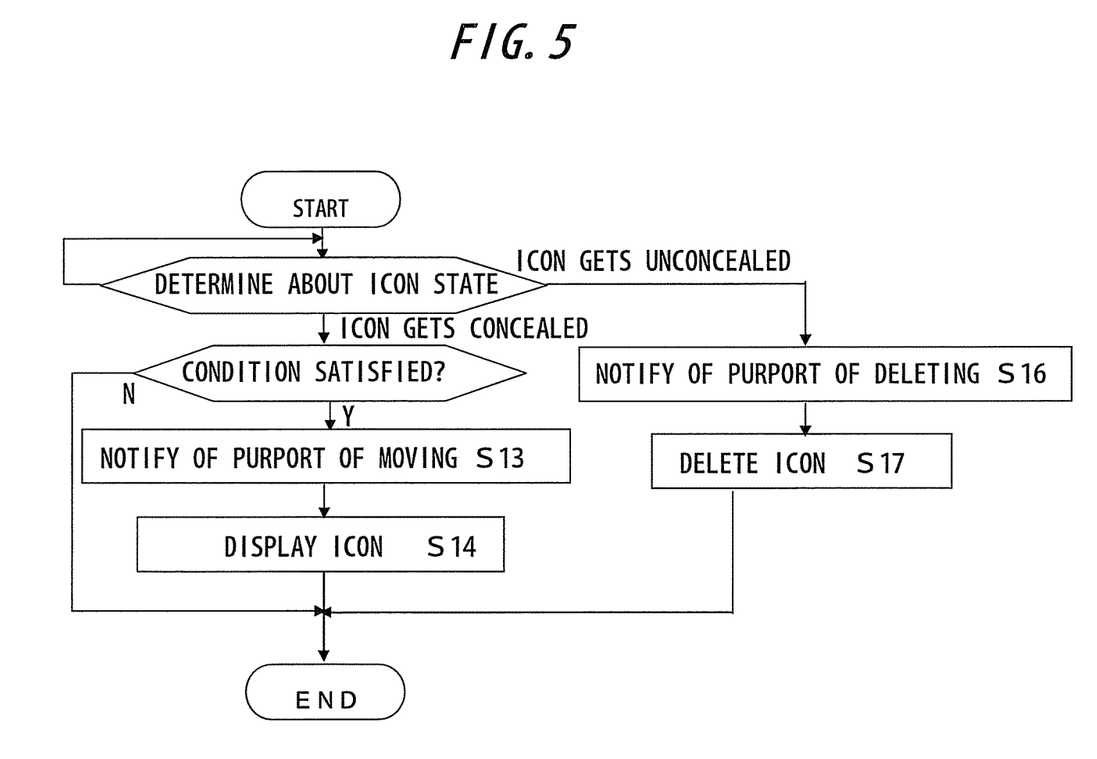
FIG. 5 is an explanatory diagram of a moving display method.

FIG. 5 is an explanatory diagram of a display method in the case of moving and thus displaying the icon.

When the portable information device 10 according to the first embodiment is started up, the icon state determining module 7 monitors the display states of the window and the object such as a dialog on the first display unit 101. To be specific, the icon state determining module 7 determines whether or not there are the icon concealed by the object and the icon that gets unconcealed by the object (S11).

Figure 6:
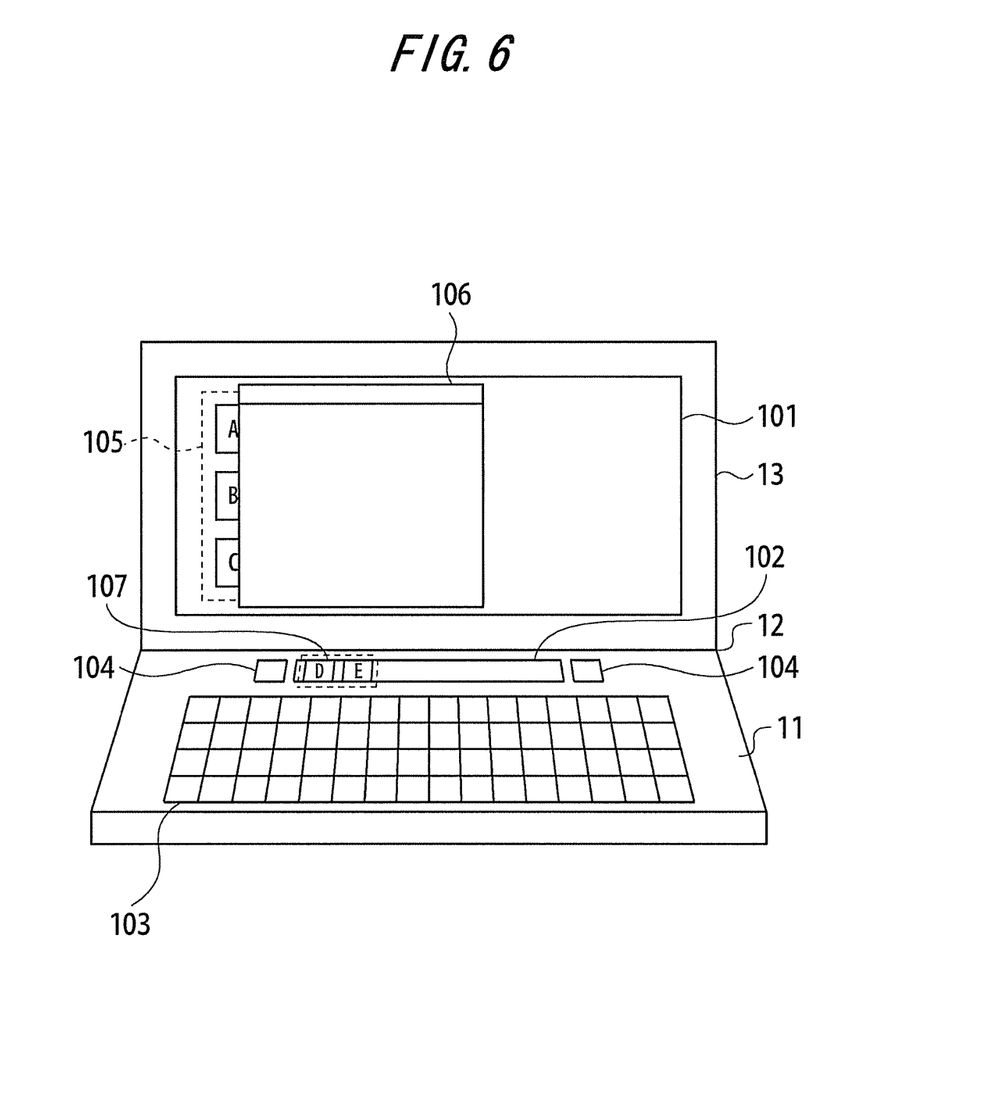
FIG. 6 is a diagram showing a state where the icon is movement-displayed.

As shown in FIG. 6, if there is a concealed icon 105, the condition determining module 8 determines whether or not the concealed icon is coincident with the predetermined condition. Namely, the condition determining module 8 determines whether the icon is registered in the condition table or not and determines, if registered, whether the icon satisfies the additional condition or not (S12).

If the icon is coincident with the moving condition, the condition determining module 8 notifies the display control unit 26 of the ID of the icon, showing a purport that the icon is moved and thus displayed (S13).

The display control unit 26 reads the display information associated with the received ID from the memory, and displays the icon based on the display information in place of the state information on the second display unit 102 (S14). Note that the display information is previously generated, while the display control unit 26 is made to store the display information in the first embodiment, however, such a scheme is also available that the CPU 21 generates the display information and notifies the display control unit 26 of the display information together with the ID in step 13.

On the other hand, if the icon gets displayed by closing the window 106 concealing the icon on the first display unit 101, the condition determining module 8 determines in step 11 that the icon gets unconcealed.

Then, the condition determining module 8 notifies the display control unit 26 of the ID of the icon together with the information purporting that the icon is displayed, i.e., gets unconcealed (S16).

The display control unit 26 receiving the notification returns the display to the display of the state information by deleting the icon on the second display unit 102 (S17).

Note that the icon on the first display unit 101 is associated with the icon on the second display unit 102 by use of the IDs thereof according to the moving display method, however, an available scheme is that the icons are associated, without being limited to this type of association, by using such items of information as the names of icons, the position information (the coordinates on the first display unit), a moving sequence and moving time.

Figure 7:
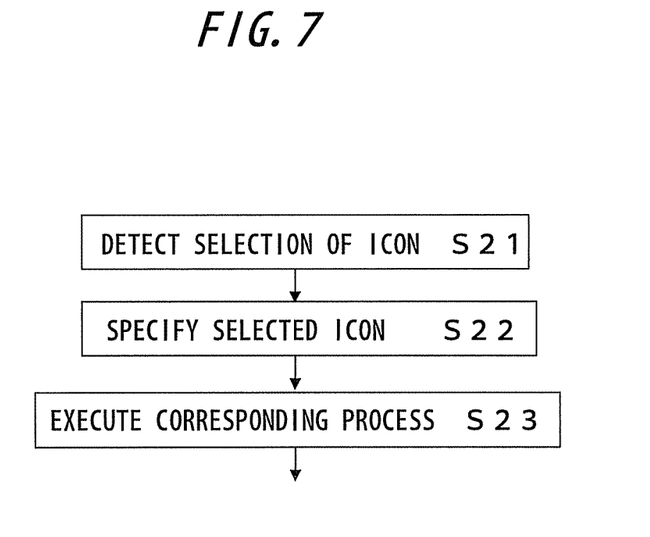
FIG. 7 is an explanatory diagram showing a process of executed after the icon has been selected.

FIG. 7 is an explanatory diagram of a process executed after selecting the icon on the second display unit.

To start with, on the occasion of displaying the icon on the second display unit 102, when the touch sensor of the second display unit 102 detects a touch and notifies the CPU 102 of the position information (S21), the CPU 21 specifies the icon displayed in this position (S22) and executes the process assigned to the icon (S23).

As described above, according to the first embodiment, the icon, even when concealed by the window on first display unit 101, can be automatically moved to the second display unit 102. Accordingly, the operability is improved without any necessity for moving and minimizing the window.

It should be noted that the first embodiment has exemplified the instance of moving and thus displaying the icon, however, the object displayable on the second display unit 102 may also be available without being limited to the icon. The displayable object is exemplified such as a tool bar, the window and a button in the window.

Figure 8:
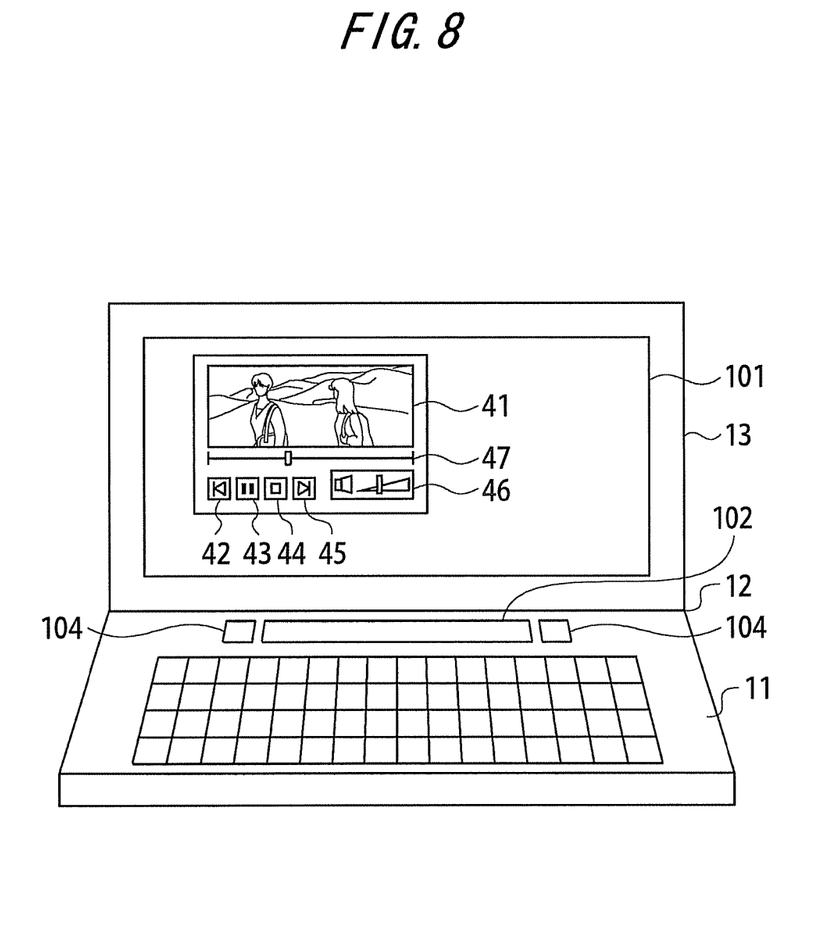
FIG. 8 is a diagram showing an example of setting another object as a moving target object.

FIG. 8 illustrates an example of displaying a window based on application software for reproducing a moving picture on the first display unit 101.

The window displays a moving picture display box 41, operation buttons 42-45, a volume adjusting knob 46, a reproducing position selection bar 47.

When displaying the moving picture on the entire screen of the first display unit 101, it follows that the objects such as the operations button 42-45, the volume adjusting knob 46 and the reproducing position selection bar 47 are concealed.

Figure 9:
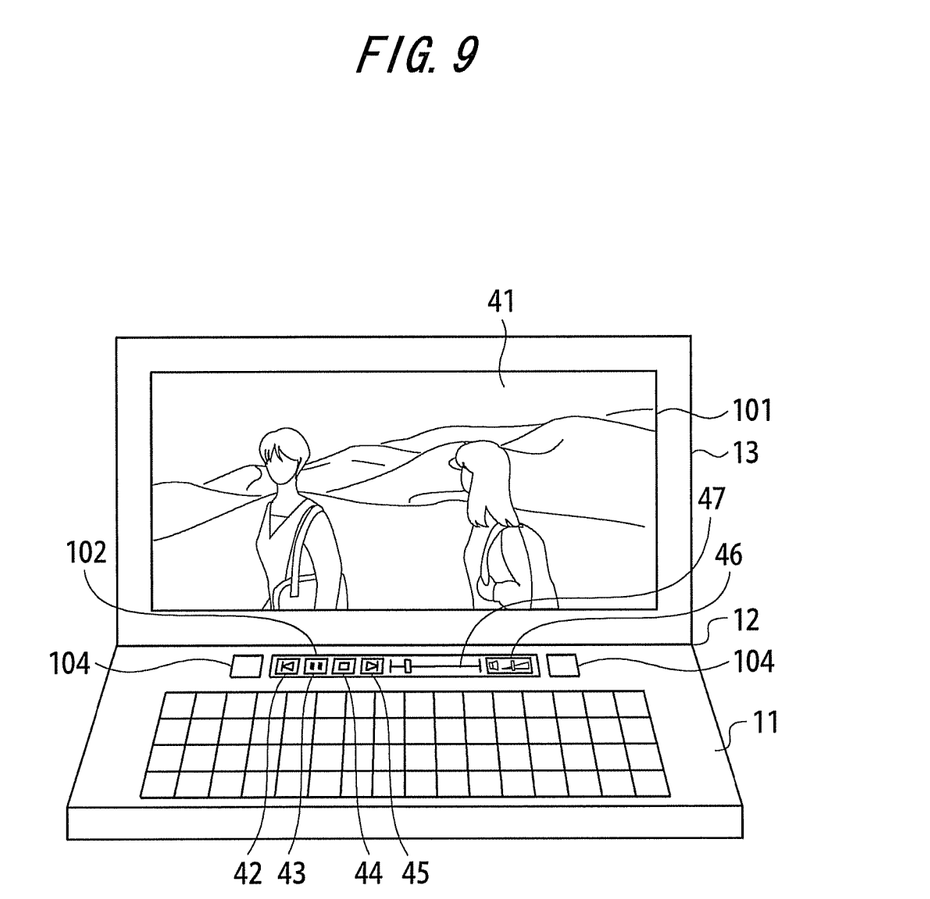
FIG. 9 is a diagram showing an example of setting another object as the moving target object.

Such being the case, in the same way as in the case of the icon described above, it is detected that the object gets concealed, and, as shown in FIG. 9, the object is moved to and displayed on the second display unit 102.

This scheme enables the operations button 42-45, the volume adjusting knob 46, the reproducing position selection bar 47, etc to be operated even in the middle of displaying the moving picture on the entire screen.

Moreover, if the window in the middle of reproducing the moving picture is concealed by another window of a word processor etc, the moving picture display box 41 may be moved to and displayed on the second display unit 102, whereby the user is allowed to watch the moving picture while operating with the word processor etc.

Second Embodiment

Figure 10:
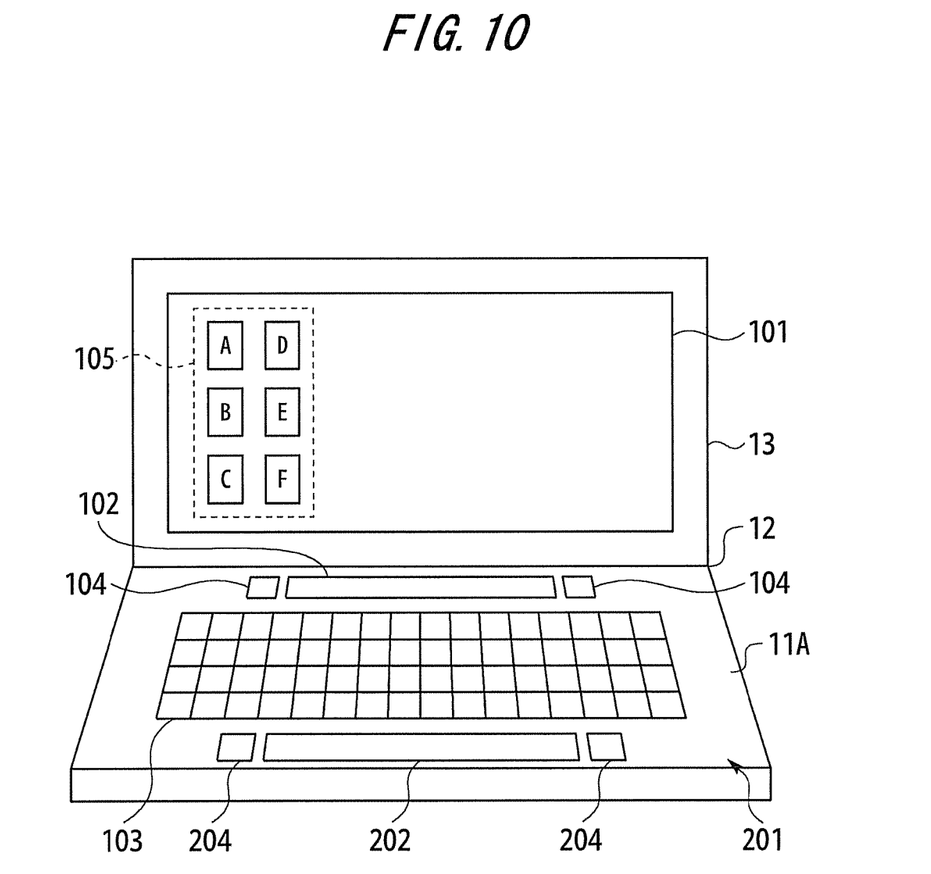
FIG. 10 is a view of an external configuration of the electronic device according to a second embodiment in a state where the electronic device opens.
Figure 11:
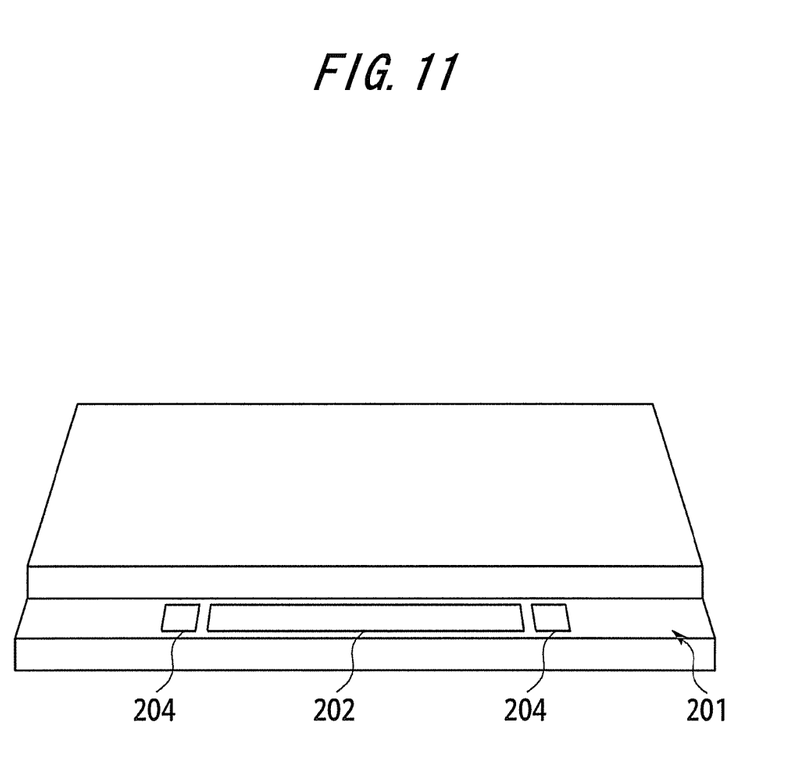
FIG. 11 is a view of the external configuration of the electronic device according to the second embodiment in a state where the electronic device closes.

FIG. 10 is a view of an external configuration in a state where the portable information device according to a second embodiment opens, and FIG. 11 is a view of the external configuration in a state where this electronic device closes.

The second embodiment is different from the first embodiment discussed above in terms of a scheme of determining that the icon is concealed even when the housing of a portable information device 10A closes, and moving and thus displaying the icon. Note that the same components are marked with the same numerals and symbols, and the repetitive explanations thereof are omitted.

As shown in FIG. 10, the portable information device 10A is constructed roughly of a lower housing 11A and the upper housing 13 provided in an openable/closable manner via the hinge portion 12 with respect to the lower housing 11.

As illustrated in FIG. 11, a front portion 201 of the lower housing 11A, which is exposed even in the closed state of the upper housing 13, is provided with a second display unit 202 and a group of various buttons 204.

Thus, even in the state where the first display unit 101 is not used (in the closed state of the upper housing 13), in order to attain the state in which the second display unit 202 is always visible, it is feasible to adopt a structure of providing the second display unit 202 according to the second embodiment in a position of the second display unit disclosed in Japanese Patent Laid-Open Publication No. H11-119875.

In FIG. 1 showing Japanese Patent Laid-Open Publication No. 11-119875, the lower housing and the upper housing of the portable information device are joined at the hinge portion, then the second display unit (which is referred to as a sub-display) is provided at the hinge portion, and the upper housing (the display unit) is formed with a notch corresponding to the second display unit.

Figure 12:
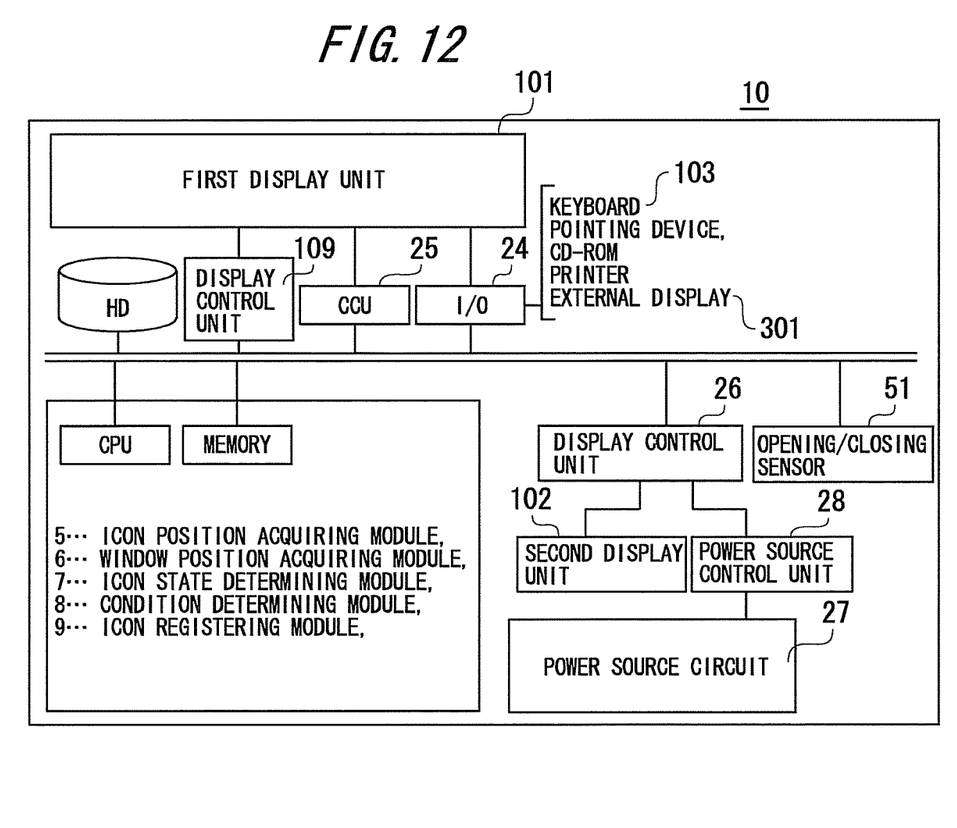
FIG. 12 is a block diagram showing a hardware configuration of the electronic device according to the second embodiment.

Moreover, FIG. 12 is a block diagram showing a hardware configuration of the portable information device 10A according to the second embodiment.

The portable information device 10A includes an opening/closing sensor 51 that detects an opening/closing state of the upper housing 13. A contrivance of the second embodiment is that the icon gets concealed when the upper housing 13 closes but gets unconcealed when the upper housing 13 opens. Namely, the opening/closing sensor 51, the icon state determining module 7 and the icon position acquiring module 5 correspond to a detection unit in the second embodiment.

Accordingly, when the opening/closing sensor 51 notifies the condition determining module 8 of the purport that the upper housing 13 closes and when the icon state determining module 7 notifies the condition determining module 8 of the purport that the icon gets concealed, as in the process described above in FIG. 5, the concealed icon is moved and thus displayed.

Note that the icon may be movement-displayed on at least any one of the second display unit 102 and the second display unit 202. For example, the icon is movement-displayed on the second display unit 202 when the upper housing 13 closes and movement-displayed on the second display unit 102 when the upper housing 13 opens. As a matter of course, the icon may also be movement-displayed on the plurality of second display units 102, 202. In this case, the setting about which second display unit, 102 or 202, the icon is displayed on may involve setting an additional condition in the condition table and setting the second display unit as the moving destination unit.

Then, when the opening/closing sensor 51 notifies the condition determining module 8 of the purport that the upper housing 13 opens and when the icon state determining module 7 notifies the condition determining module 8 of the purport that the icon gets unconcealed, as in the process described above in FIG. 5, the icons on the second display units 102, 202 are deleted.

As discussed above, according to the second embodiment, the icon can be movement-displayed depending on the opening/closing state of the portable information device.

\<Others\>

Herein, the recording medium readable by the computer connotes a recording medium capable of storing information such as data and programs electrically, magnetically, optically, mechanically or by chemical action, which can be read from the computer. Among these recording mediums, for example, a flexible disc, a magneto-optic disc, a CD-ROM, a CD-R/W, a DVD, a DAT, an 8 mm tape, a memory card, etc are given as those demountable from the computer.

Further, a hard disc, a ROM (Read-Only Memory), etc. are given as the recording mediums fixed within the computer.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An electronic device comprising:
   a first display unit configured to display an object as a graphical user interface;
   a second display unit;
   a detection unit configured to detect whether the object is concealed at a predetermined rate or more by overlapping with another object displayed on the first display unit;
   a determining unit configured to determine whether or not the concealed object is matching a predetermined condition designated by a user;
   a display control unit configured to display the object matching the predetermined condition on the second display unit and to delete the object from the second display unit when the object is not overlapped at the predetermined rate or more with another object on the first display unit;
   wherein the predetermined condition is registering the object in a condition table;
   wherein when the detection unit detects that the object is not concealed by another object, the display of the object is deleted from on the second display unit; and
   wherein the display control unit displays state information showing a state of the electronic device at a normal time on the second display unit, then displays, when the object on the first display unit is detected to be concealed, the object in place of the state information on the second display unit, and displays, when the object on the first display unit is detected to not be concealed, the state information in place of the object on the second display unit.

2. The electronic device according to claim 1, further comprising a processing unit executing, when the object displayed on the second display unit is selected, a process assigned to the object.

3. A display method by which an electronic device comprising a first display unit and a second display unit executes:
   displaying an object as a graphical user interface on the first display unit;
   detecting whether the object is concealed at a predetermined rate or more by overlapping with another object displayed on the first display unit;
   determining whether or not the concealed object is matching a predetermined condition designated by a user;
   displaying the object matching the predetermined condition on the second display unit;
   deleting the object from the second display unit when the object is not overlapped at the predetermined rate or more with another object on the first display unit;
   wherein the predetermined condition is registering the object in a condition table;
   wherein when detecting that the object is not concealed by another object, the display of the object is deleted from on the second display unit; and
   wherein state information showing a state of the electronic device is displayed on the second display unit at a normal time, then, when the object on the first display unit is detected to be concealed, the object is displayed in place of the state information on the second display unit, and when the object on the first display unit is detected to not be concealed, the state information in place of the object on the second display unit.

4. The display method according to claim 3, wherein the electronic device executes, when the object displayed on the second display unit is selected, a process assigned to the object.

5. A non-transitory storage medium readable by computer, storing a display program for making a computer comprising a first display unit and a second display unit executes:
   displaying an object as a graphical user interface on the first display unit;
   detecting whether the object is concealed at a predetermined rate or more by overlapping with another object displayed on the first display unit;
   determining whether or not the concealed object is matching a predetermined condition designated by a user;
   displaying the object matching the predetermined condition on the second display unit;
   deleting the object from the second display unit when the object is not overlapped at the predetermined rate or more with another object on the first display unit;
   wherein the predetermined condition is registering the object in a condition table;
   wherein when detecting that the object is not concealed by another object, the display of the object is deleted from on the second display unit; and
   wherein state information showing a state of the electronic device is displayed on the second display unit at a normal time, then, when the object on the first display unit is detected to be concealed, the object is displayed in place of the state information on the second display unit, and when the object on the first display unit is detected to not be concealed, the state information in place of the object on the second display unit.

6. The storage medium according to claim 5, wherein the computer executes, when the object displayed on the second display unit is selected, a process assigned to the object.

* * * * *